United States Patent
Thompson

(10) Patent No.: US 11,110,846 B2
(45) Date of Patent: Sep. 7, 2021

(54) CAMPER EXPANSION SYSTEM AND METHOD OF USE

(71) Applicant: Tyler Thompson, Seattle, WA (US)

(72) Inventor: Tyler Thompson, Seattle, WA (US)

( * ) Notice: Subject to any disclaimer, the term of this patent is extended or adjusted under 35 U.S.C. 154(b) by 0 days.

(21) Appl. No.: 16/191,045

(22) Filed: Nov. 14, 2018

(65) Prior Publication Data

US 2020/0148089 A1     May 14, 2020

(51) Int. Cl.
*B60P 3/34*     (2006.01)

(52) U.S. Cl.
CPC ...................... *B60P 3/34* (2013.01)

(58) Field of Classification Search
CPC ............. B60P 3/34; B60J 7/165; B60J 7/1657
USPC ..................... 296/160, 165, 26.06
See application file for complete search history.

(56) References Cited

U.S. PATENT DOCUMENTS

| | | | | |
|---|---|---|---|---|
| 1,917,824 A * | 7/1933 | Burns | ....................... | B60P 3/34 296/173 |
| 3,394,961 A * | 7/1968 | Matte | ....................... | B60P 3/34 296/169 |
| 3,694,022 A * | 9/1972 | Dontigny | .................. | B60P 3/34 296/170 |
| 3,709,551 A * | 1/1973 | McCarthy | ................. | B60P 3/34 296/170 |
| 3,768,855 A * | 10/1973 | Laue | ........................ | B60P 3/34 296/26.02 |
| 4,201,413 A * | 5/1980 | Rowe | ........................ | B60P 3/34 296/165 |
| 4,262,956 A * | 4/1981 | Kellam | ..................... | B60P 3/34 296/26.07 |
| 4,317,590 A * | 3/1982 | Young | ...................... | B60J 7/165 296/176 |
| 6,439,647 B1 * | 8/2002 | Baldwin | ................ | B60J 7/1657 296/164 |
| 6,840,569 B1 * | 1/2005 | Leigh | ........................ | B60P 3/34 296/173 |
| 2014/0251401 A1 * | 9/2014 | Barber | .................. | E04H 1/1205 135/121 |
| 2017/0335561 A1 * | 11/2017 | Wickramasekera | .. | H01L 31/042 |

* cited by examiner

*Primary Examiner* — Jason S Morrow
(74) *Attorney, Agent, or Firm* — Leavitt Eldredge Law Firm

(57) ABSTRACT

A camper expansion system allows for a rigidly walled camper to be expandable from its travel or storage position to its usable position. When the top expands upward it pulls the front and rear panels up and outward and the side panels follow these until the expandable part of the system is upright and secured in potion by the top.

1 Claim, 5 Drawing Sheets

CAMPER EXPANSION SYSTEM AND METHOD OF USE

BACKGROUND

1. Field of the Invention

The present invention relates generally to camping systems, and more specifically, to a vehicle topper system for converting the back or bed of a truck to a more versatile configuration such as a camper.

2. Description of Related Art

Camping systems are well known in the art and are effective means to provide equipment to facilitate traveling and remaining in undeveloped areas. For example, conventional tents are portable structures that are assembled and allow a person or persons to sleep or enter for protection or privacy. Another common shelter is a vehicle topper that encloses the bed of a truck so that the space therein is protected from the elements to provide shelter and privacy.

One of the problems commonly associated with tents or campers is their limited use. For example, tents must be carried by a person or persons and the size and space then tent protects is limited by the weight that can be carried. Tents are also lightweight and are susceptible to high winds.

Additionally, campers are fixed to vehicles and are not commonly portable without the vehicle. The camper is also of a fixed size so not to lower the fuel efficiency of the vehicle. This limited size does not commonly allow a person to stand while in the protected space.

Accordingly, although great strides have been made in the area of camping systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
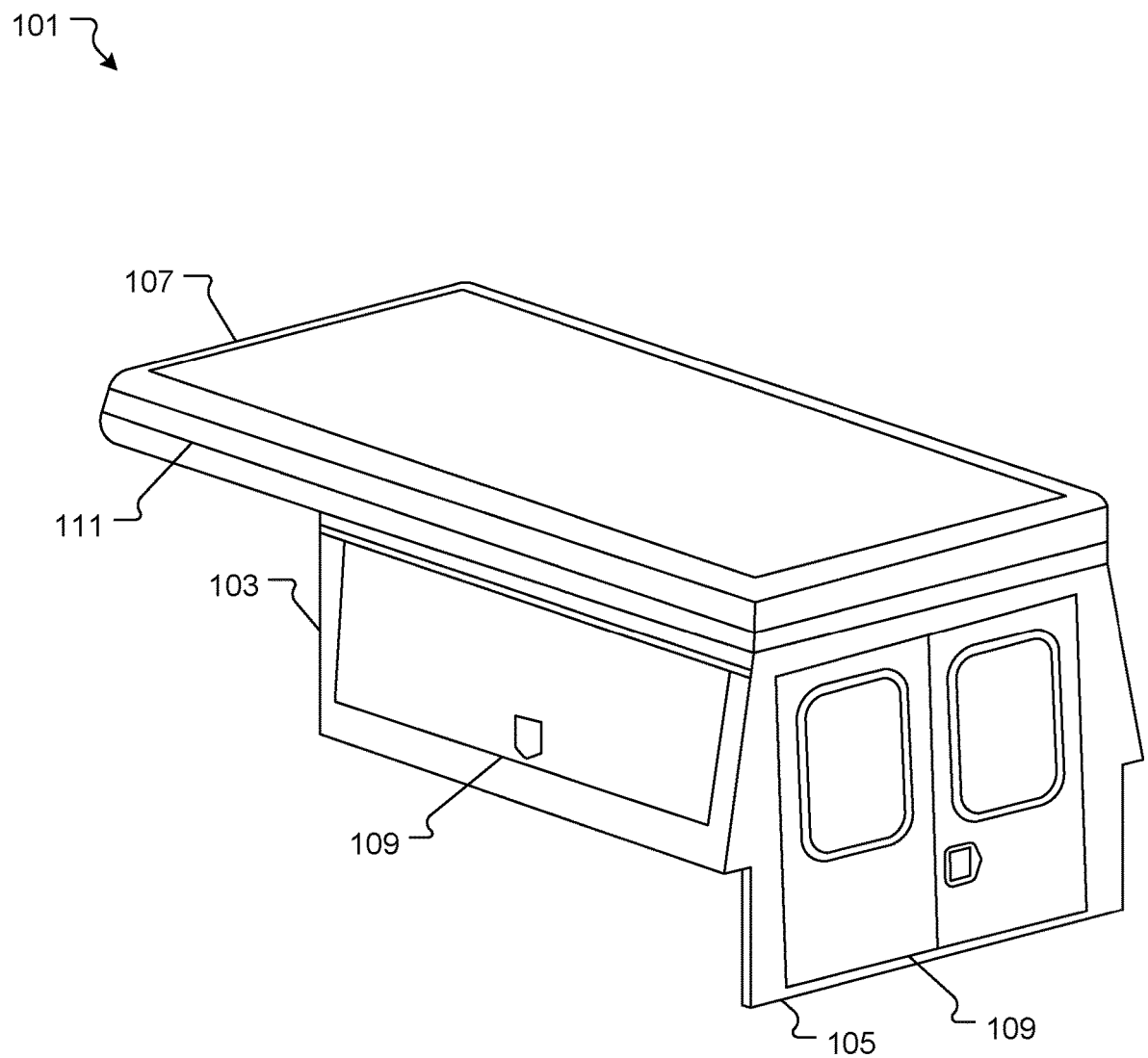
FIG. 1 is a perspective view of a camper expansion system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional camper systems. Specifically, the invention of the present application provides for a portable, quickly assembled structure that enhances the space closed in the back of a vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a perspective view of a camper expansion system in accordance with a preferred embodiment of the present application. It will be appreciated that system 101 overcomes one or more of the above-listed problems commonly associated with conventional camping systems.

In the contemplated embodiment, system 101 includes sidewalls 103 attached by an end wall 105 and a top 107. The end wall having a door 109 through which the space enclosed is accessible. The top 107 shares a joining line 111 with the sidewalls 103 and end wall 105.

Figure 2:
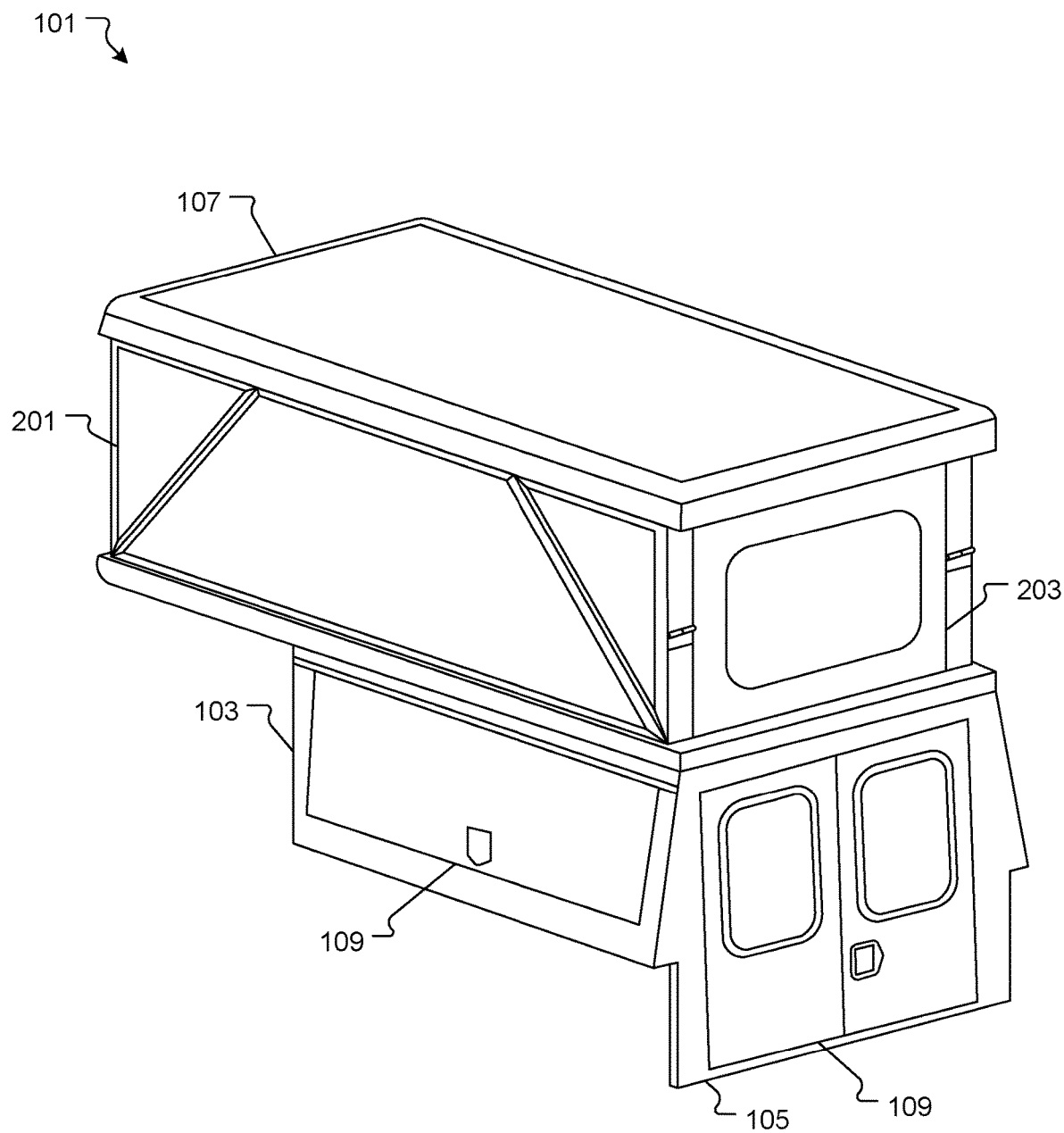
FIG. 2 is a perspective view of the system of FIG. 1 after being expanded.

Referring now to FIG. 2, the system 101 is depicted in the expanded state and includes expandable side panels 201, expandable rear panel 203 and an expandable front panel. The top 107 is removed from the joining line 111 and continues to enclose the space within the system 101.

Figure 3A:
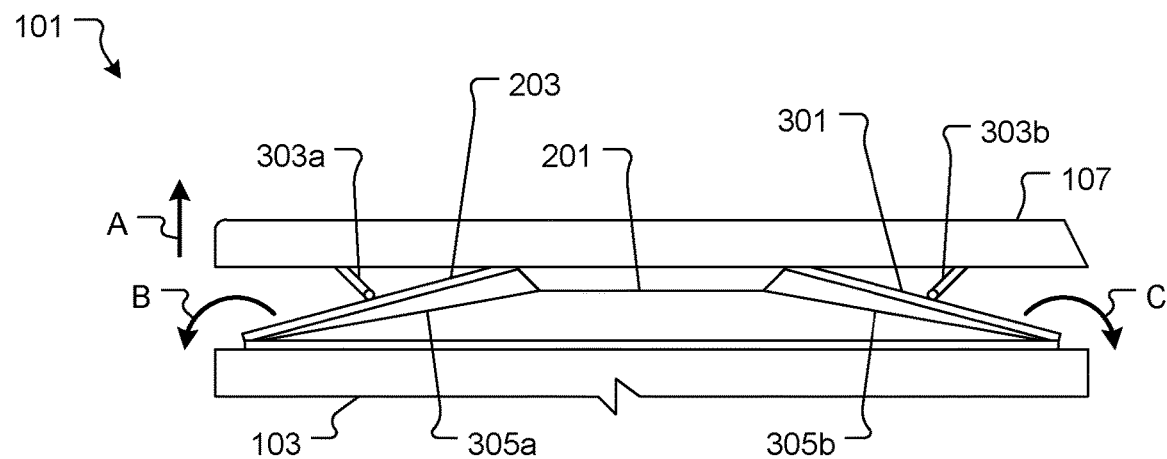
FIGS. 3A and 3B are side views of the expansion method of the system of FIG. 2.
Figure 3B:
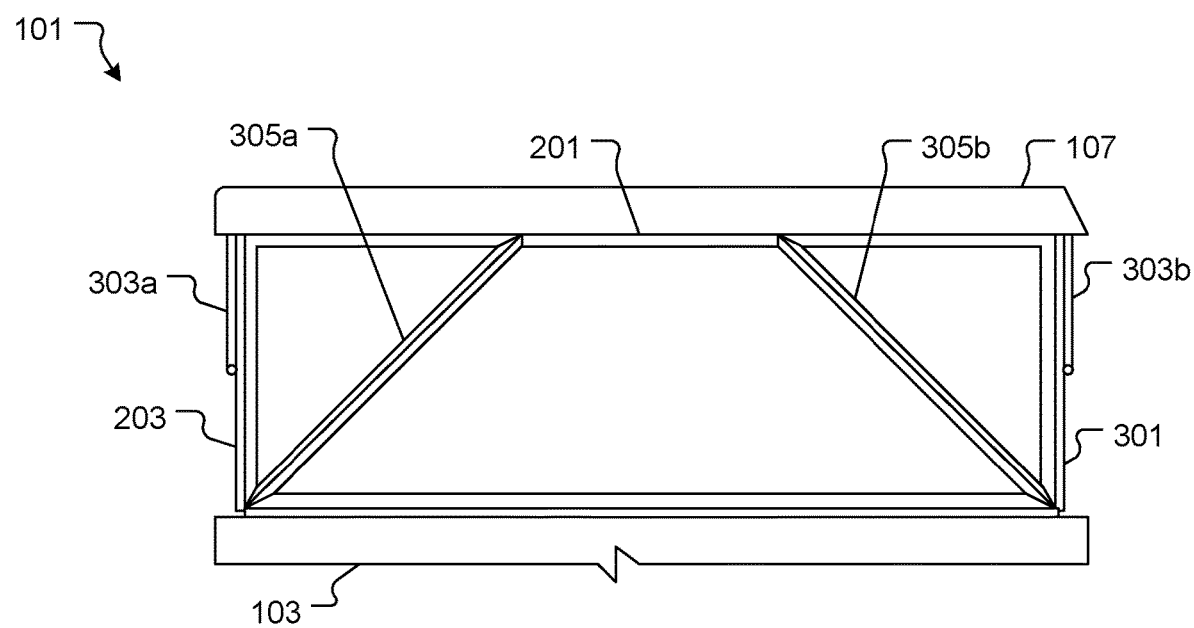

It should be appreciated that one of the unique features believed characteristic of the present application is that expandable side 201, rear 203 and front panels enables the use of additional space within the bed of a vehicle and ensure that a person is able to stand within the space In the contemplated embodiment 101 the expandable panels are of a rigid material to provide increased durability and protection for the space they enclose. Referring now to FIGS. 3A and 3B the method of expansion is depicted. In use, the top 107 is elevated as depicted by motion, this causes the expandable rear panel 203 to pivot as depicted by motion B and the expandable front panel 301 pivots as depicted by motion C. the expandable rear panel 203 and expandable front panel are attached to the top via hinged arms 303. The motion of the expandable rear panel 203 and expandable front panel 301 cause the expandable side panels 201 to rise and move towards the outer edge of the system 101. The expandable side panels 201 are hinged along lines 305 that enable the folding motion thereof.

Figure 4A:
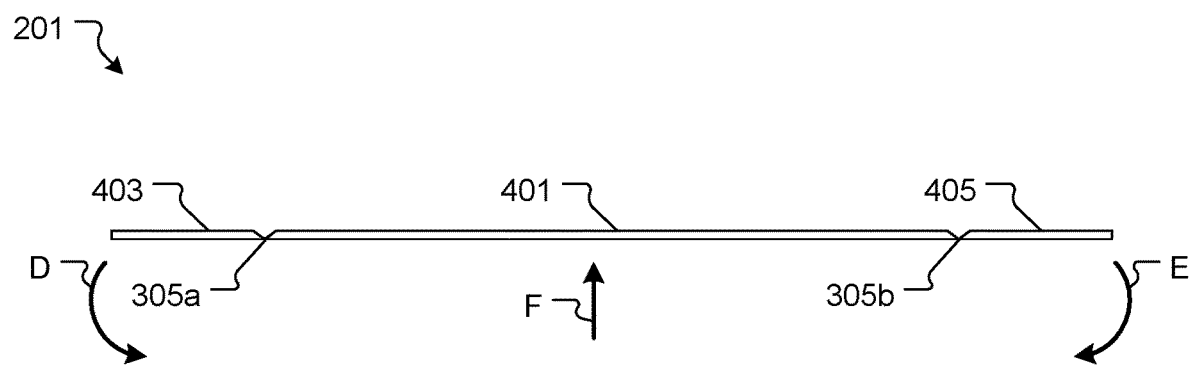
FIGS. 4A and 4B are top views of a sidewall of FIG. 1 retracting.
Figure 4B:
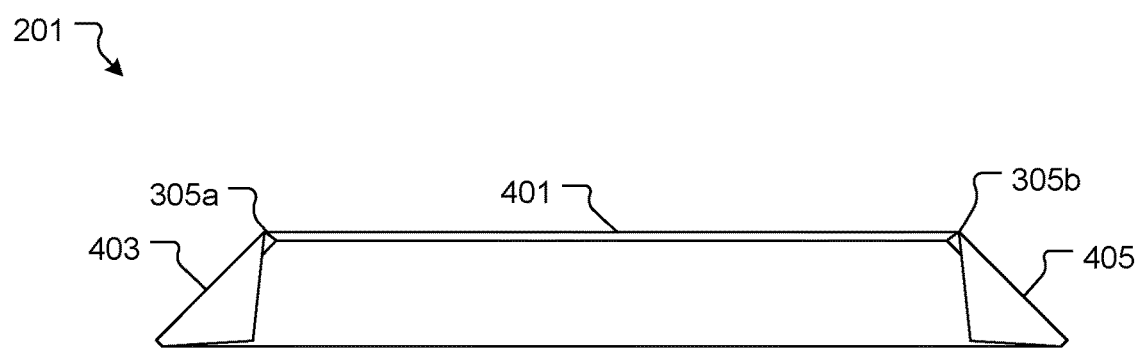

As depicted by FIGS. 4A and 4B the expandable side panels 201 include a first edge section 403 pivotally attached to a center section 401 at one end with a second edge section 405 pivotally attached and the opposite end via lines 305. It will be appreciated that as the first edge section 403 pivots about hinge line 305a as depicted by motion D and as the second edge section 405 pivots along hinge line 305b as depicted by motion E the center section 401 lowers and moves towards the center as depicted by motion F.

Figure 5:
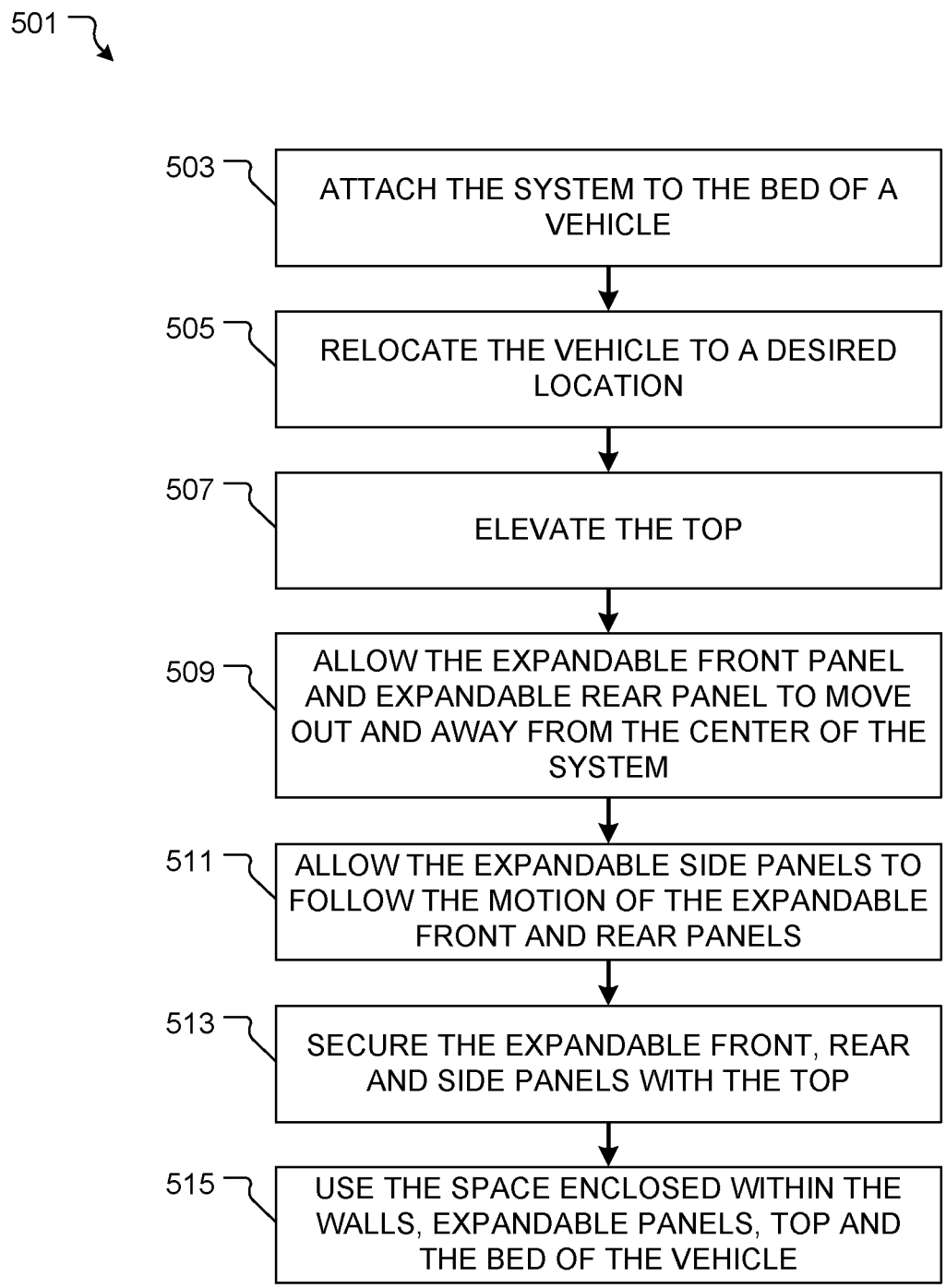
FIG. 5 is a flowchart of the preferred method of use of the system of FIG. 1.

Referring now to FIG. 5 the preferred method of use of the system 101 is depicted. Method 501 includes attaching the system to the bed of a vehicle 503, relocating the vehicle to a desired location 505, elevating the top 507, allowing the expandable front panel and expandable rear panel to move out and away from the center of the system 509, allowing the expandable side panels to follow the motion of the expandable front and rear panels 511, securing the expandable front, rear and side panels with the top 513 and using the space enclosed within the walls, expandable panels, top and vehicle 515.

The particular embodiments disclosed above are illustrative only, as the embodiments may be modified and practiced in different but equivalent manners apparent to those skilled in the art having the benefit of the teachings herein.

It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A removable camper expansion system comprising:
   at least two sidewalls, the at least two sidewalls are configured to fit on a structure, the at least two sidewalls including:
   at least one end wall;
   at least one front wall;
   at least one top; and
   a plurality of expandable articulated rigid panels, the plurality of expandable articulated rigid panels comprising:
      a first side panel having a first side section and a second side section both pivotally attached to a center section, the center section is trapezoidal in shape and the first side section and the second side section are triangular in shape;
      a second side panel;
      a front panel; and
      a back panel;
   wherein the first side panel, the second side panel, the front panel, and the back panel open and displace the top upwards;
   wherein during opening the first side section and the second side section pivot away from the center section to open the first side panel into a rectangle while the front panel and the back panel unfold outwardly;
   wherein when the top is displaced upwards at least one of the expandable articulated rigid panels move upwards and away from the center thereof; and
   wherein the said walls and rigid panels articulate in position to enclose a space below the top.

* * * * *